United States Patent
Lee

(10) Patent No.: US 10,053,175 B1
(45) Date of Patent: Aug. 21, 2018

(54) BICYCLE LIGHTING DEVICE

(71) Applicant: Wen-Sung Lee, Taichung (TW)

(72) Inventor: Wen-Sung Lee, Taichung (TW)

(73) Assignee: GUAN HUNG TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 15/630,959

(22) Filed: Jun. 23, 2017

(51) Int. Cl.
| | |
|---|---|
| *B62J 6/00* | (2006.01) |
| *F21V 33/00* | (2006.01) |
| *B62J 6/04* | (2006.01) |
| *B60Q 1/46* | (2006.01) |
| *B60Q 1/30* | (2006.01) |

(52) U.S. Cl.
CPC ........ *B62J 6/04* (2013.01); *B60Q 1/30* (2013.01); *B60Q 1/46* (2013.01); *B60Q 2300/054* (2013.01); *B60Q 2300/43* (2013.01)

(58) Field of Classification Search
USPC .......................................................... 362/473
See application file for complete search history.

(56) References Cited

U.S. PATENT DOCUMENTS

| | | | | |
|---|---|---|---|---|
| 5,570,151 | A * | 10/1996 | Terunuma | G03B 13/02 396/263 |
| 9,227,555 | B2 * | 1/2016 | Kalapodas | B60Q 1/085 |
| 2006/0170370 | A1 * | 8/2006 | De Anna | H05B 33/0848 315/185 S |
| 2009/0122565 | A1 * | 5/2009 | Gibbons | B60Q 1/0088 362/466 |
| 2011/0196574 | A1 * | 8/2011 | Krieg | B60Q 1/143 701/36 |
| 2014/0233250 | A1 * | 8/2014 | Lee | B60Q 1/0023 362/465 |

* cited by examiner

Primary Examiner — Tuyen K Vo

(57) ABSTRACT

A bicycle lighting device includes a reflection cup in which a light collection unit and a light source and are respectively located therein. A speed detector is connected to the bicycle lighting device and a controller so as to detecting the speed of a vehicle moving toward the bicycle. The light collection unit collects brightness of the headlight of the vehicle. A pulse width modulation unit is electrically connected to the light collection unit and the light source. The pulse width modulation unit adjusts the flashing frequency of the light source according to the speed of the vehicle moving toward the bicycle lighting device.

2 Claims, 7 Drawing Sheets

BICYCLE LIGHTING DEVICE

BACKGROUND OF THE INVENTION

1. Fields of the Invention

The present invention relates to a bicycle lighting device, and more particularly, to a bicycle lighting device and the flashing frequency of the bicycle lighting device changes according to the speed that the vehicle moves toward the bicycle.

2. Descriptions of Related Art

The conventional bicycle light devices are usually controlled by the users and provide an ON/OFF switch to control the bicycle light devices to perform in different modes such as full-lighting mode, half-lighting mode, flashing mode and off mode. However, if the users to turn on the lighting device, or the lighting device is not operated in a proper mode, such as the bicycle lighting devices may not be seen by vehicles headlights that are much brighter than the bicycle lighting devices.

Some manufacturers develop a bicycle lighting device which has at least one light emitting diode (LED), and the LED flashes by proper electronic components cooperated with the LED so as to provide signals to the drivers of vehicles moving toward the bicycle. When the brightness of the surrounding is bright enough, the LED automatically shuts off. Some of the bicycle lighting devices are cooperated with a solar panel which provides electric power to the lighting devices.

However, the flashing frequency is fixed so that the drivers of vehicles can easily be used to the flashing frequency and ignore it. This may cause incorrect judgement to the distance between the vehicles and the bicycle.

The present invention intends to provide a bicycle lighting device, and the flashing frequency changes according to the change of light of the headlights of the vehicles and the speed that the vehicles moving toward the bicycle, so that the drivers of the vehicles can receive obvious signals and avoid from hitting the bicycles.

SUMMARY OF THE INVENTION

The present invention relates to a bicycle lighting device and comprises a reflection cup located at the front end of the bicycle lighting device. A light source is located at the rear end in the reflection cup. A speed detector is connected to the bicycle lighting device and electrically connected to a controller. The speed detector detects speed of a vehicle that moves toward the bicycle lighting device. A light collection unit is connected to the bicycle lighting device and electrically connected to the controller. The light collection unit faces the headlight of the vehicle and collects brightness of the headlight of the vehicle. A pulse width modulation unit is electrically connected to the light collection unit and the light source. When the light collection unit collects brightness of the headlight of the vehicle, the output current of the pulse width modulation unit is zero and the light source is not activated.

The controller is connected to the bicycle lighting device and electrically connected to the pulse width modulation unit. The controller receives the speed of the vehicle that the speed detector detects and/or the brightness of the headlight of the vehicle that is collected by the light collection unit. The controller sends a command to the pulse width modulation unit, so that the pulse width modulation unit adjusts the flashing frequency of the light source according to the speed of the vehicle moving toward the bicycle lighting device.

Preferably, a convex lens is connected to a front end of the reflection cup to concentrate light beams from the headlight of the vehicle.

Preferably, the light collection unit is located at the reflection cup.

Preferably, the light collection unit is a photographic semi-conductor.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
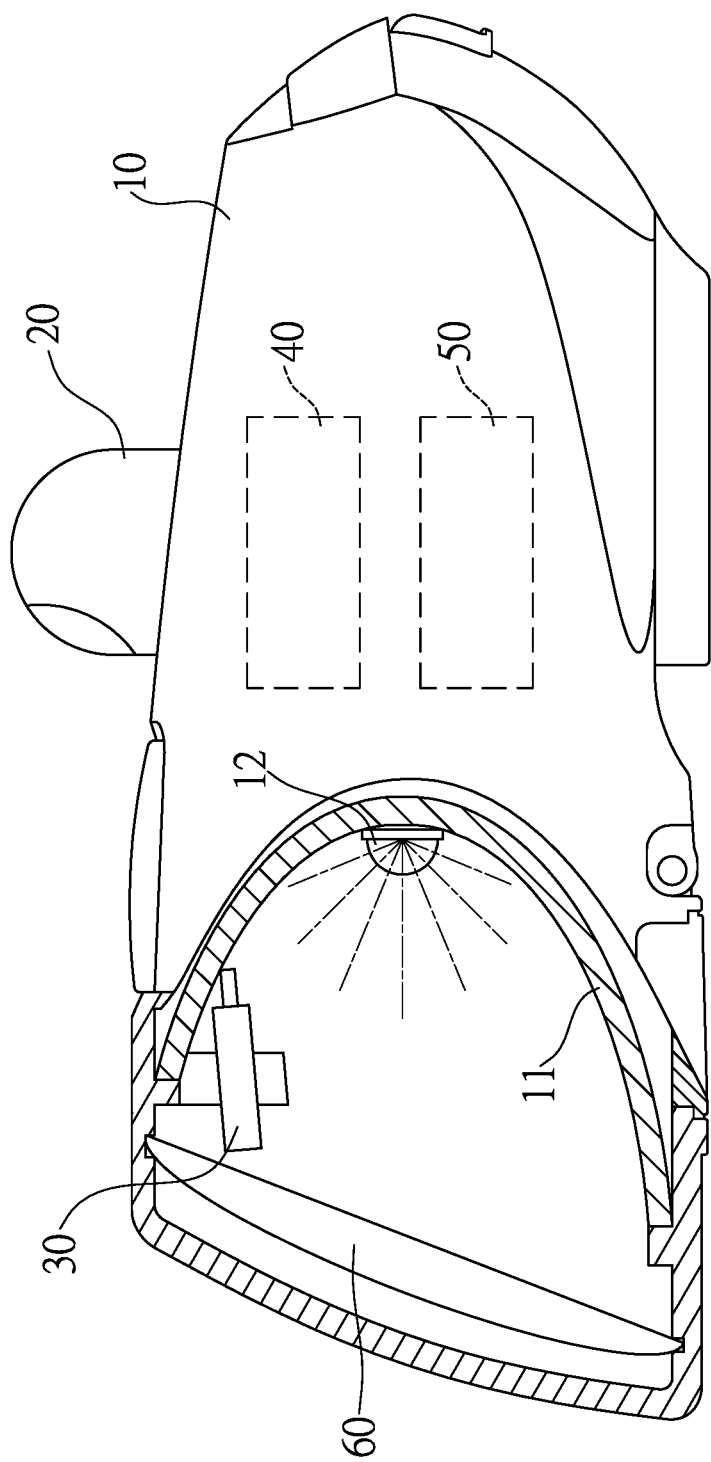
FIG. 1 is a partial cross sectional view of the bicycle lighting device of the present invention.
Figure 2:
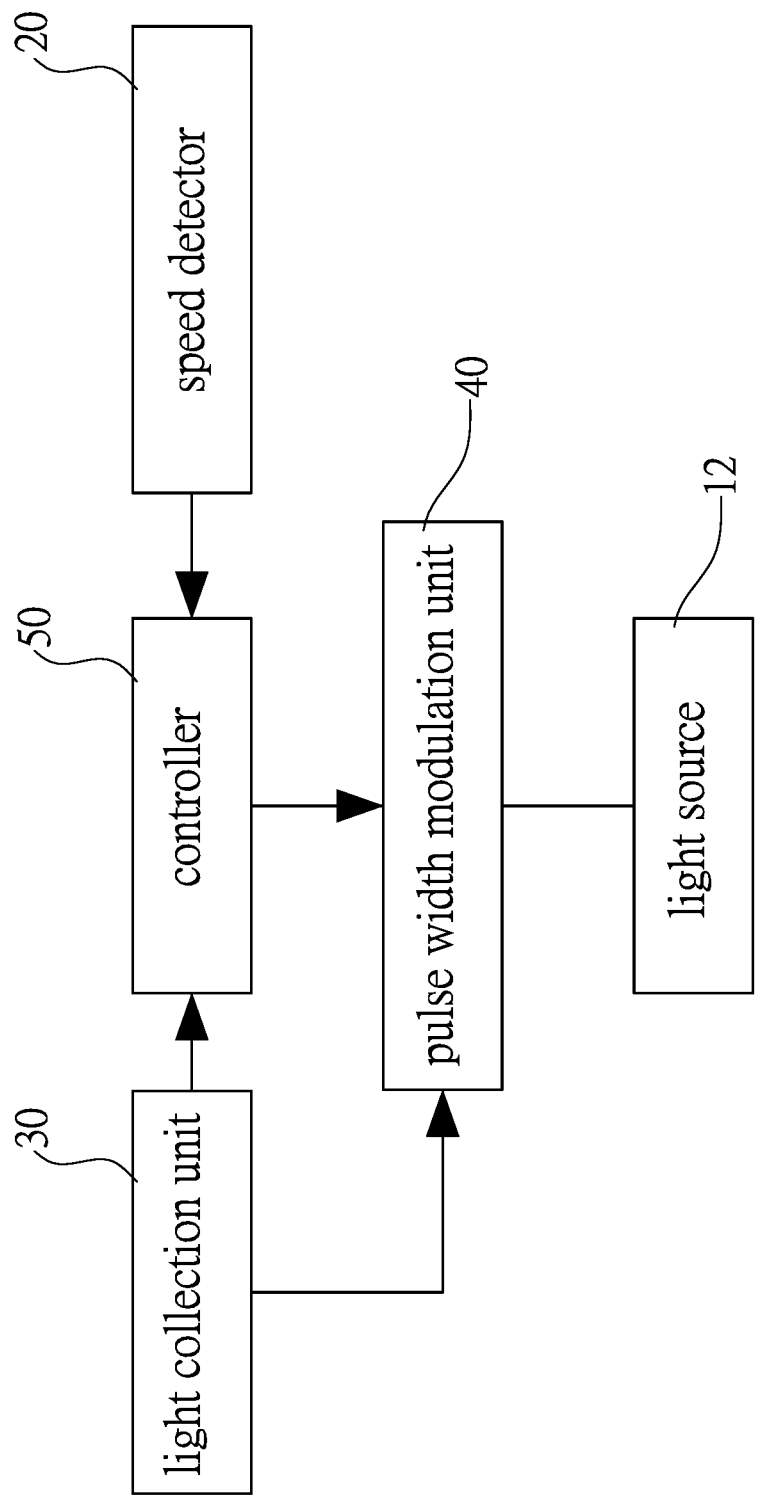
FIG. 2 illustrates the components of the bicycle lighting device of the present invention.

Referring to FIGS. 1 to 7, the bicycle lighting device 10 of the present invention comprises a reflection cup 11 located at the front end of the bicycle lighting device 10. A light source 12 is located at the rear end in the reflection cup 11. A speed detector 20 is connected to the bicycle lighting device 10 and electrically connected to a controller 50. The speed detector 20 detects speed of a vehicle 70 that moves toward the bicycle lighting device 10. A light collection unit 30 is connected to the bicycle lighting device 10 and electrically connected to the controller 50. The light collection unit 30 faces the headlight 71 of the vehicle 70 and collects brightness of the headlight 71 of the vehicle 70 that moves toward the bicycle lighting device 10. A pulse width modulation unit 40 is electrically connected to the light collection unit 30 and the light source 12. When the light collection unit 30 collects brightness of the headlight 71 of the vehicle 70, the output current of the pulse width modulation unit 40 is zero and the light source 12 is not activated.

The controller 50 is connected to the bicycle lighting device 10 and electrically connected to the pulse width modulation unit 40. The controller 50 receives the speed of the vehicle 70 that the speed detector 20 detects and/or the brightness of the headlight 71 of the vehicle 70 that is collected by the light collection unit 30. The controller 50 sends a command to the pulse width modulation unit 40, so that the pulse width modulation unit 40 adjusts the flashing frequency of the light source 12 according to the speed of the vehicle 70 moving toward the bicycle lighting device 10.

Specifically, a convex lens 60 is connected to a front end of the reflection cup 11 to concentrate light beams from the headlight 71 of the vehicle 70 that moves toward the bicycle lighting device 10. The light collection unit 30 is located at the reflection cup 11, and can be a photographic semi-conductor.

Figure 3:
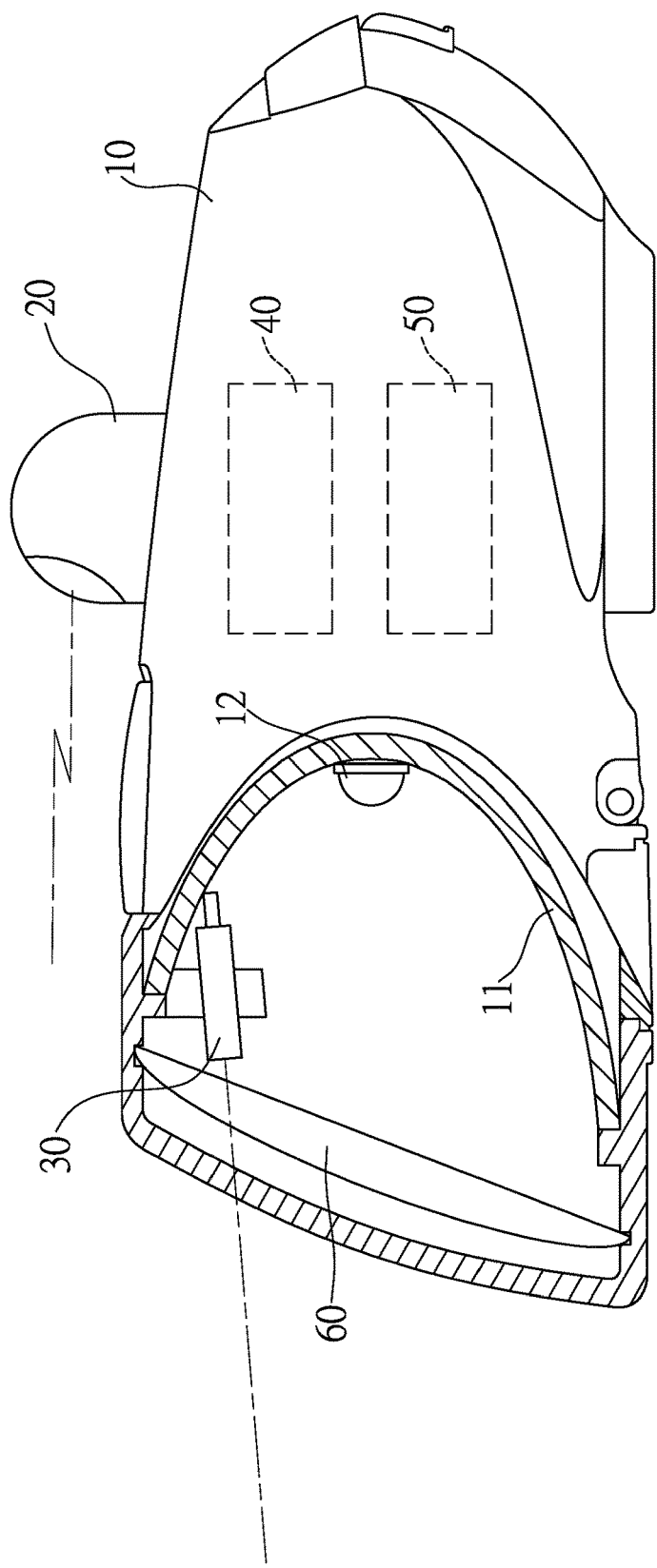
FIG. 3 is a partial cross sectional view to show the operation of the bicycle lighting device of the present invention.
Figure 4:
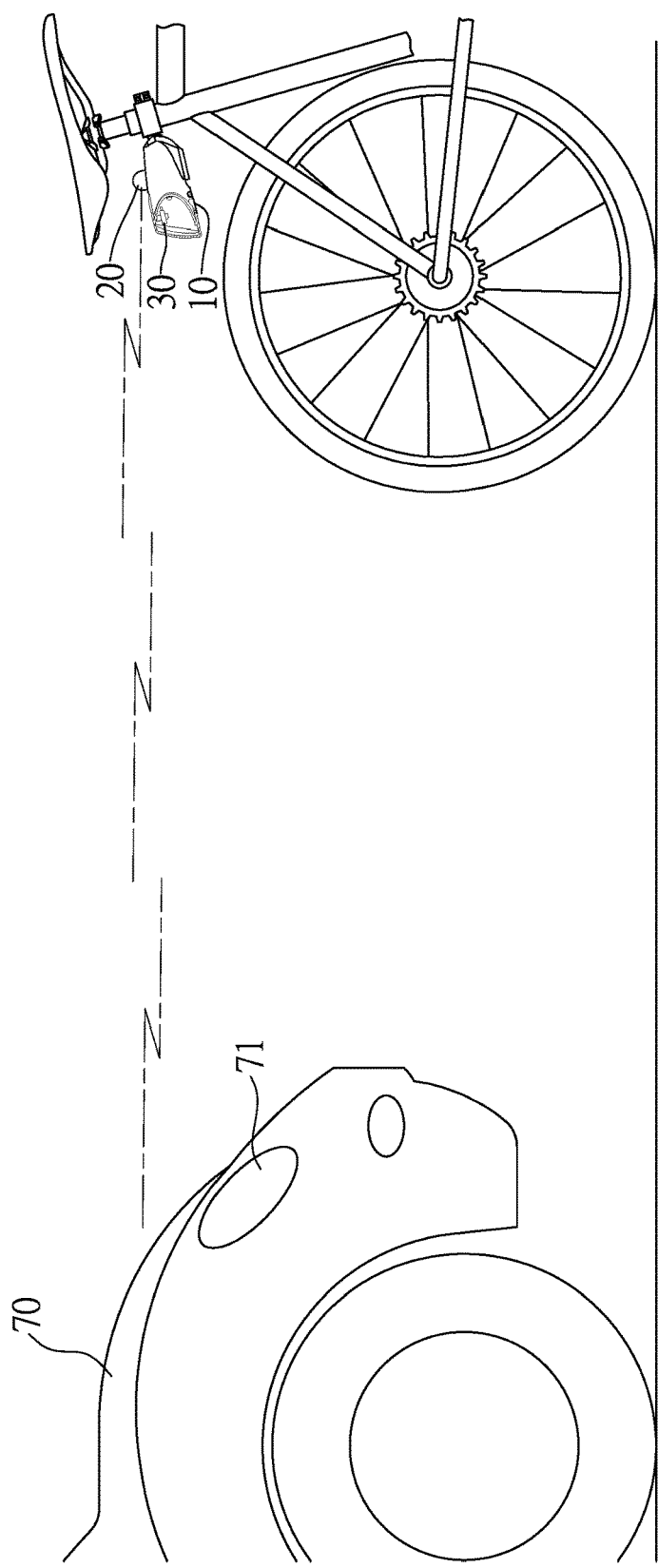
FIG. 4 shows that the bicycle lighting device of the present invention detects the vehicle moving toward the bicycle.
Figure 5:
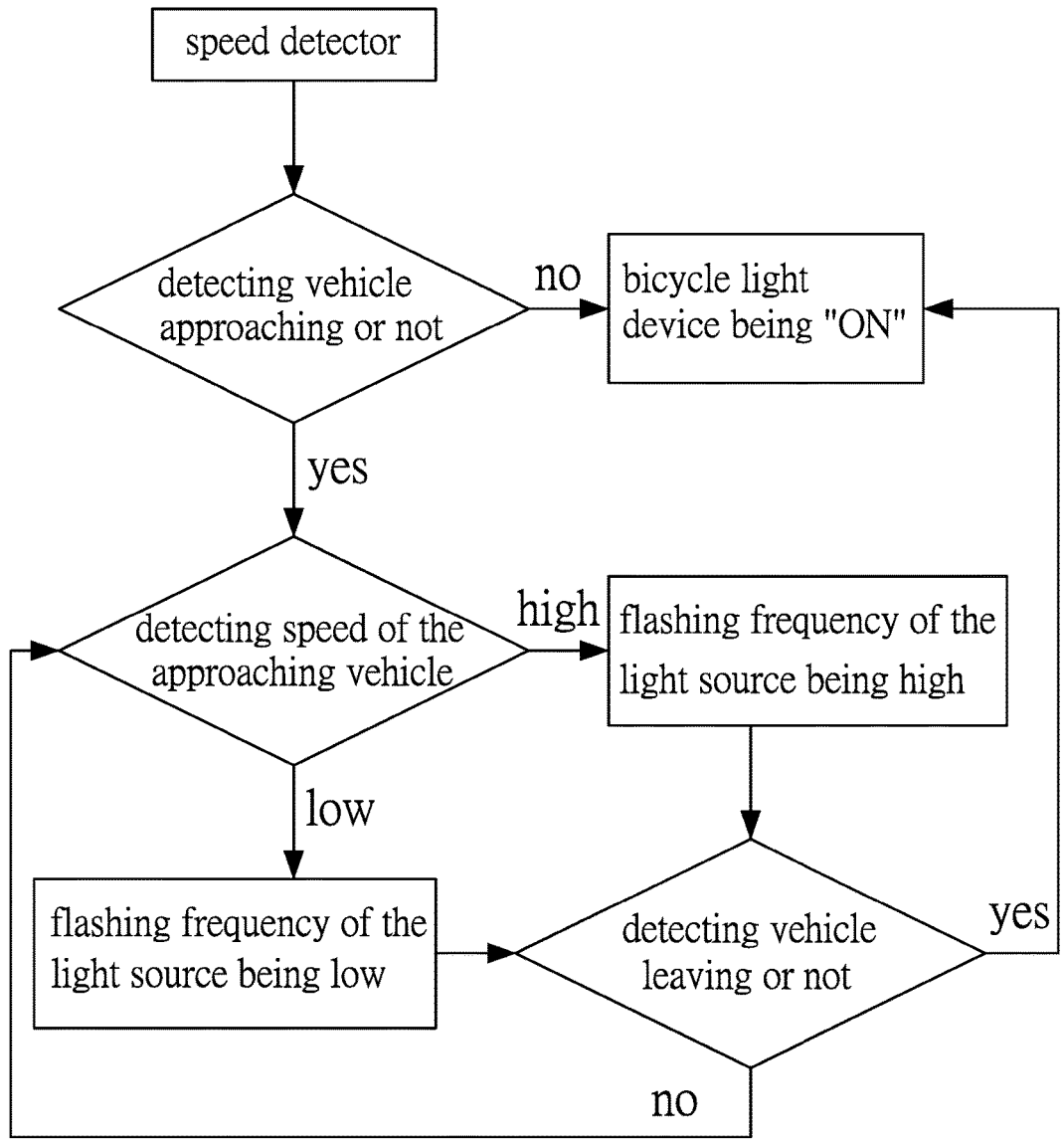
FIG. 5 is a flow chart of the control of the bicycle lighting device of the present invention with regard to the distance of the vehicle moving toward the bicycle.

As shown in FIGS. 3 and 4, the controller 50 commands the speed detector 20 to emit a detection wave to detect whether the vehicle 70 is closing to the bicycle or not. As shown in FIG. 5, if no vehicle 70 moving close to the bicycle, the bicycle lighting device 10 remains the normal situation which means that the bicycle lighting device 10 is "ON". If there is a vehicle 70 moves close to the bicycle, the speed detector 20 detects the speed of the vehicle 70. If the vehicle 70 moves toward the bicycle at a high speed, the controller 50 sends a command to the pulse width modulation unit 40 to adjust the flashing frequency of the light source 12 to be high. If the vehicle 70 moves toward the bicycle at a low speed, the controller 50 sends a command to the pulse width modulation unit 40 which adjusts the flashing frequency of the light source 12 to be low. The speed detector 20 then emits a detection wave to detect whether the vehicle 70 leaves or not. If the vehicle 70 leaves, the controller 50 controls the bicycle lighting device 10 to remain the normal situation which means that the bicycle lighting device 10 is "ON". If the vehicle 70 does not leave, the controller 50 controls the speed detector 20 to detect the speed that the vehicle 70 moves toward the bicycle lighting device 10, and simultaneously adjusts the flashing frequency of the light source 12.

Figure 6:
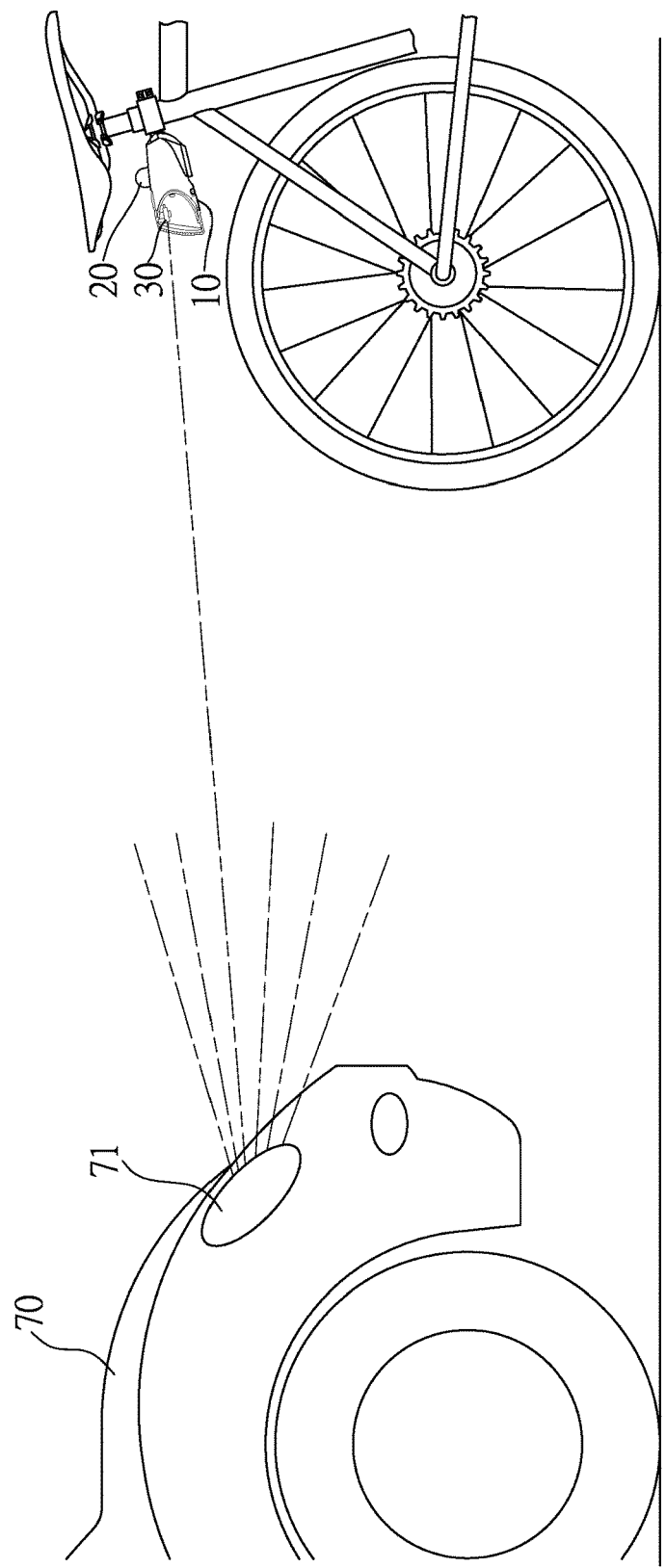
FIG. 6 shows that the bicycle lighting device of the present invention detects light beams from the headlight of the vehicle moving toward the bicycle.
Figure 7:
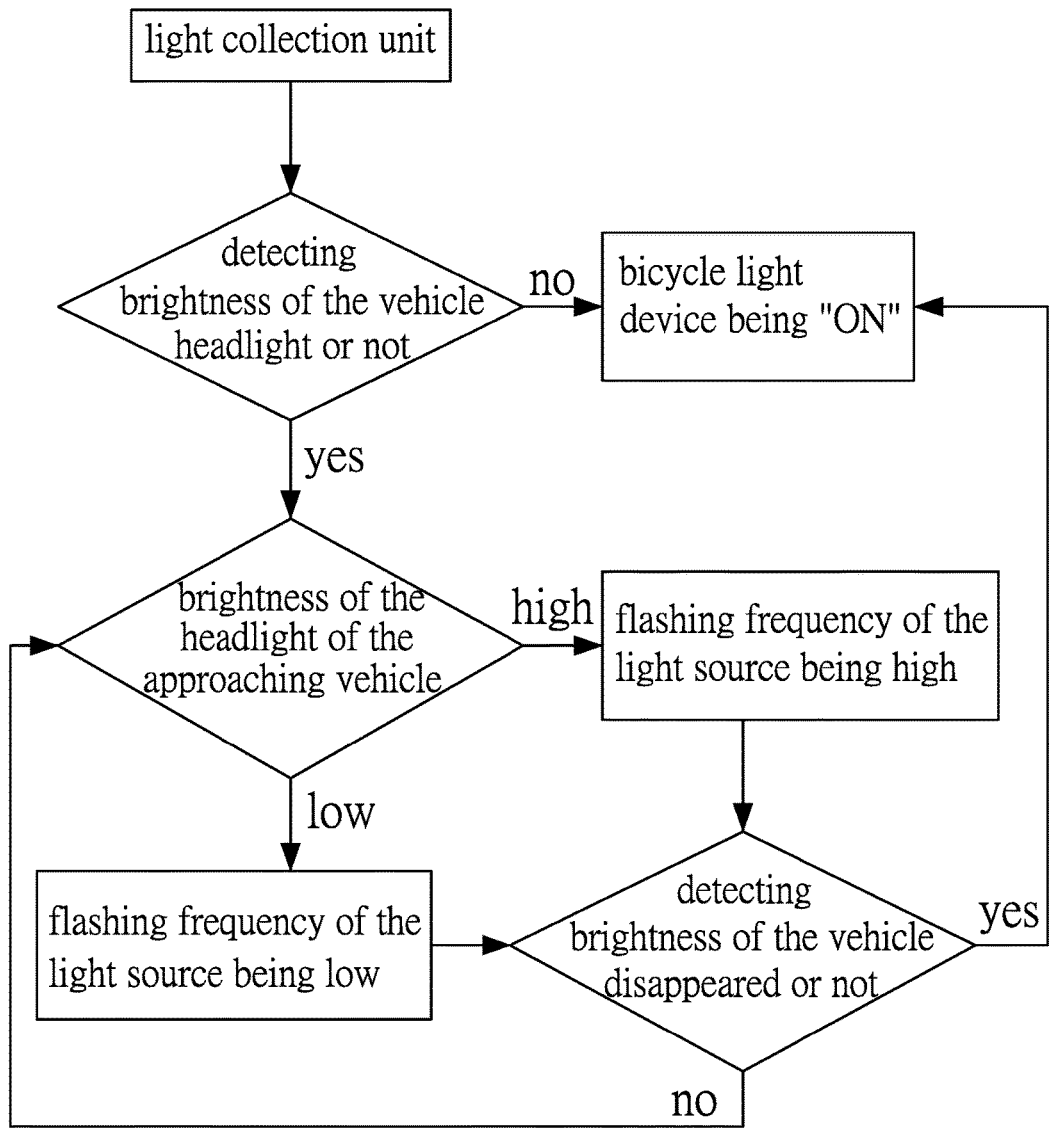
FIG. 7 is a flow chart of the control of the bicycle lighting device of the present invention with regard to the brightness of the headlight of the vehicle moving toward the bicycle.

As shown in FIGS. 3 and 6, the controller 50 uses the light collection unit 30 that faces the headlight 71 of the vehicle 70 to collect the information of brightness of the headlight 71 of the vehicle 70. As shown in FIG. 7, if no brightness is collected from the headlight 71 of the vehicle 70, the bicycle lighting device 10 remains the normal situation which means that the bicycle lighting device 10 is "ON". If there is brightness from the headlight 71 of the vehicle 70 collected by the light collection unit 30, the light collection unit 30 collects the brightness of the headlight 71. If the brightness collected is high, the controller 50 sends a command to the pulse width modulation unit 40 which adjusts the flashing frequency of the light source 12 to be high. If the brightness collected is low, the controller 50 sends a command to the pulse width modulation unit 40 which adjusts the flashing frequency of the light source 12 to be low.

The light collection unit 30 then detects whether the vehicle 70 is disappear or not. If the vehicle 70 is disappear, the controller 50 controls the bicycle lighting device 10 to remain the normal situation which means that the bicycle lighting device 10 is "ON". If the vehicle 70 is no disappear, the controller 50 controls the light collection unit 30 to continuously detect the brightness of the headlight 71 of the vehicle 70 so as to adjusts the flashing frequency of the light source 12.

The controller 50 uses the speed detector 20 and/or the light collection unit 30 to collect information to judge whether the vehicle 70 is approaching to the bicycle or not, when the controller 50 receives both of the speed detector 20 which shows the vehicle moves toward the bicycle at high speed, and the light collection unit 30 which shows that the brightness of the headlight 71 of the vehicle 70 is high, the controller 50 compares the two different information from the speed detector 20 and the light collection unit 30 so that the controller 50 is able to precisely adjust the flashing frequency of the light source 12 to provide sufficient signals to the driver of the vehicle so as to protect the user of the bicycle.

While we have shown and described the embodiment in accordance with the present invention, it should be clear to those skilled in the art that further embodiments may be made without departing from the scope of the present invention.

What is claimed is:

1. A bicycle lighting device comprising:
   a reflection cup (11) located at a front end of the bicycle lighting device (10), a convex lens (60) connected to a front end of the reflection cup (11) to concentrate light beams from a headlight (71) of a vehicle (70) that moves toward the bicycle lighting device (10), a light source (12) located at a rear end in the reflection cup (11);
   a speed detector (20) connected to the bicycle lighting device (10) and electrically connected to a controller (50), the speed detector (20) detecting a speed of the vehicle (70) that moves toward the bicycle lighting device (10);
   a light collection unit (30) connected to the bicycle lighting device (10) and located at the reflection cup (11), the light collection unit (30) electrically connected to the controller (50), the light collection unit (30) facing the headlight (71) of the vehicle (70) and collecting brightness of the headlight (71) of the vehicle (70);
   a pulse width modulation unit (40) electrically connected to the light collection unit (30) and the light source (12), when the light collection unit (30) collects brightness of the headlight (71) of the vehicle (70), an output current of the pulse width modulation unit (40) is zero and the light source (12) is not activated, and
   the controller (50) connected to the bicycle lighting device (10) and electrically connected to the pulse width modulation unit (40), the controller (50) receiving at least one of the speed of the vehicle (70) that the speed detector (20) detects and the brightness of the headlight (71) of the vehicle (70) that is collected by the light collection unit (30), the controller (50) sending a command to the pulse width modulation unit (40), the pulse width modulation unit (40) adjusting a flashing frequency of the light source (12) according to the speed of the vehicle (70) moving toward the bicycle lighting device (10).

2. The bicycle lighting device as claimed in claim 1, wherein the light collection unit (30) is a photographic semi-conductor.

* * * * *